(12) United States Patent
Wallmann

(10) Patent No.: US 6,316,065 B1
(45) Date of Patent: Nov. 13, 2001

(54) PROCESS AND DEVICE FOR MANUFACTURING A CUTTING TOOL

(75) Inventor: Clemens Wallmann, Erlangen (DE)

(73) Assignee: BLE Bayerisches Laserzentrum gemeinnutzige Forschungsgesellschaft mbH, Erlangen (DE)

(*) Notice: Subject to any disclaimer, the term of this patent is extended or adjusted under 35 U.S.C. 154(b) by 0 days.

(21) Appl. No.: 09/284,077
(22) PCT Filed: Oct. 7, 1996
(86) PCT No.: PCT/EP96/04341
   § 371 Date: Apr. 7, 1999
   § 102(e) Date: Apr. 7, 1999
(87) PCT Pub. No.: WO98/15672
   PCT Pub. Date: Apr. 16, 1998
(51) Int. Cl.[7] .............................. C23C 4/12; C23C 4/06; C23C 4/10; C23C 24/10; B05D 1/12
(52) U.S. Cl. ................. 427/596; 427/597; 219/121.66; 219/121.82
(58) Field of Search .................... 427/596, 597, 427/554, 555, 556, 559, 561; 118/641; 219/121.65, 121.66, 121.82, 121.84, 121.85

(56) References Cited

U.S. PATENT DOCUMENTS

| | | | |
|---|---|---|---|
| Re. 32,244 | * 9/1986 | Andersen | 427/450 |
| 2,841,687 | 7/1958 | Richter. | |
| 3,342,626 | * 9/1967 | Batchelor et al. | 427/450 |
| 3,839,618 | * 10/1974 | Muehlberger | 427/450 |
| 4,146,654 | * 3/1979 | Guyonnet | 427/450 |
| 4,218,494 | * 8/1980 | Belmondo et al. | 427/596 |
| 4,644,127 | * 2/1987 | La Rocca | 427/596 |
| 4,743,733 | * 5/1988 | Mehta et al. | 427/597 |
| 4,947,463 | * 8/1990 | Matsuda et al. | 427/596 |
| 5,038,014 | * 8/1991 | Pratt et al. | 427/596 |
| 5,122,632 | * 6/1992 | Kinkelin | 427/597 |
| 5,270,296 | * 12/1993 | Hed | 427/596 |
| 5,405,660 | * 4/1995 | Psiuk et al. | 427/597 |
| 5,462,772 | * 10/1995 | Lemelson | 427/596 |
| 5,688,564 | * 11/1997 | Coddet et al. | 427/597 |
| 5,910,343 | * 6/1999 | Olofsson | 427/597 |

FOREIGN PATENT DOCUMENTS

| | | |
|---|---|---|
| 0 562 920 | 9/1993 | (EP) . |
| 0 573 928 | 12/1993 | (EP) . |
| WO 93/21360 | 10/1993 | (WO) . |

* cited by examiner

Primary Examiner—Marianne Padgett
(74) Attorney, Agent, or Firm—Browdy and Neimark

(57) ABSTRACT

A method and an apparatus (6, 7) are disclosed for manufacturing a cutting tool (1') provided with at least one cutting body (3'). The base body (2) of the tool is moved in a certain direction (10), and during this time a substance (4) that contains particles of cutting material (12) is applied on a bearing surface (5') of the base body (2) of the tool by supply means (6). A heating device (7) melts the substance (4) on the bearing surface (5'), binding the substance (4) to the bearing surface (5'). The bearing surface (5') is moved section by section in the direction of displacement (10) of the base body (2) of the tool in the opposite direction to the force of gravity (G) at least during the setting time of the substance (4) applied on each section (17') of the bearing surface (5').

10 Claims, 2 Drawing Sheets

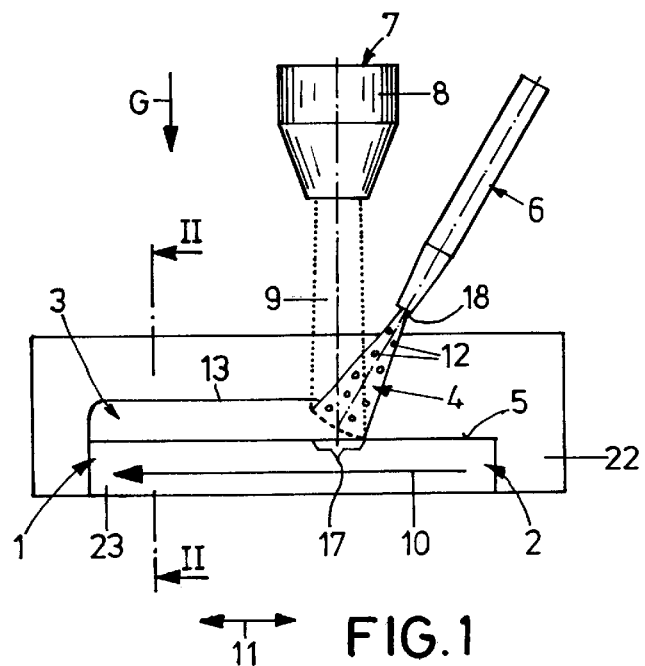
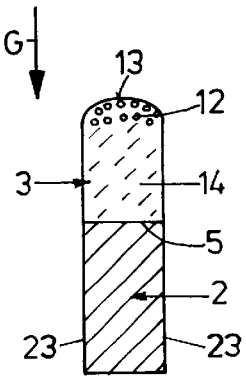
FIG.1
FIG.2
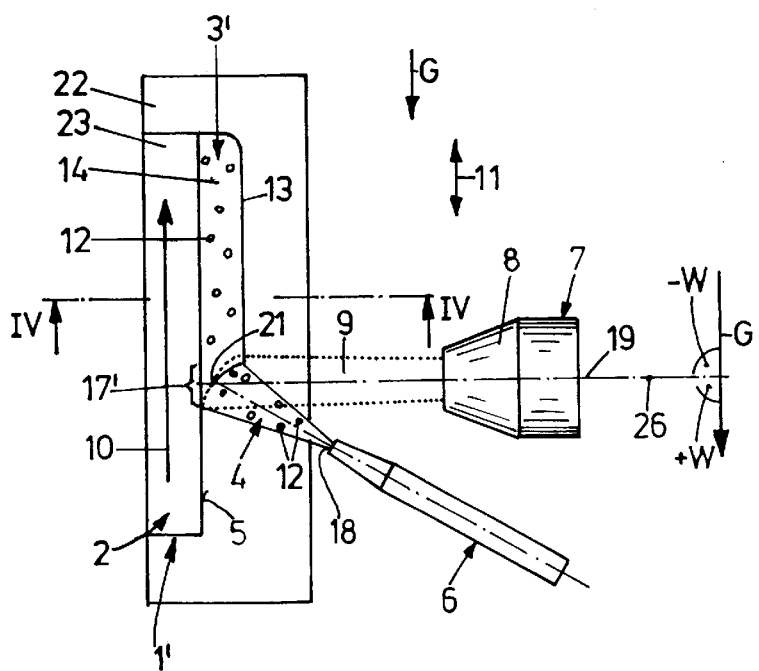
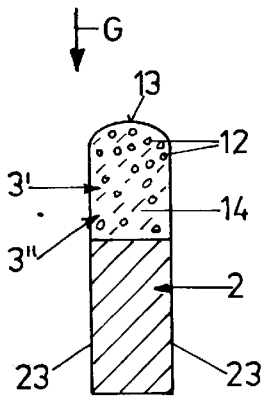
FIG.3
FIG.4

PROCESS AND DEVICE FOR MANUFACTURING A CUTTING TOOL

BACKGROUND OF THE INVENTION

1. Field of the Invention

The invention relates to a method of manufacturing a cutting tool having at least one cutting body, a base body of the cutting tool being moved during the manufacture of the cutting body, a substance containing particles of cutting material being deposited on a bearing surface of the moved base body, and the substance being melted on the bearing surface and united with the bearing surface while solidifying to form the cutting body; and to an apparatus for the manufacture of a cutting tool having at least one cut tiny body, comprising a drive which drives the base body in the direction of displacement; supply means depositing a substance containing the particles of cutting material on a bearing surface of the tool base body; and a heating device melting the substance on the bearing surface and uniting it with the bearing surface for the manufacture of the cutting body.

2. Background Art

For the manufacture of a cutting tool it has been known to make the cutting body of the tool from metal bonded diamond layers. This is put into practice for instance by powder metallurgy or by plating out metals on pre-deposited diamond particles. The cutting bodies thus fabricated are then united with a base body of a tool by soldering or laser beam welding. Drawbacks of these known methods reside in the complicated and costly manufacture of the cutting tool which is accompanied with correspondingly high labor costs.

A less expensive way of producing the cutting tool is put into practice by the aid of single-stage laser beam coating. In this manufacturing process, the layer containing cutting material or the cutting body, respectively, are produced in one single operation and united with the metallic base body of the tool. During this operation, the base body of the tool is moved horizontally, i.e. transversely to the direction of the force of gravity. A substance containing the cutting material, for instance diamond particles, is deposited on the surface of the moved tool base body that will bear the future cutting body. A heating device subjects the bearing surface to heat energy. This is where a molten bath is formed, to which the substance is fed and where it is melted. A drawback of this manufacturing process resides in the floating of the particles of cutting material in the molten bath against the force of gravity. As a result of the high specific density difference of the individual components of the substance, the particles of cutting material shift within the cutting body molten bath when the lifetime of this melt is too long during the manufacturing process. As a result, there is no uniform distribution of the particles of cutting material within the volume of the cutting body, which would be necessary for a continuous cutting quality to be obtained throughout the height of the cutting body. A concentration of cutting material results in the outer area of the cutting body that is turned away vertically from the bearing surface, while the portions of the cutting body that are turned towards the bearing surface contain virtually no cutting material. The floating of the cutting material and the irregular distribution thereof along the overall height of the cutting body can be partially suppressed in the case of cutting body geometries of up to approximately 2 mm of width and 3 mm of height by a reduction of the setting time; in the case of cutting body geometries of greater dimensions, the irregular distribution of the cutting material can, however, not be prevented by modification of parameters such as advance velocity of the base body of the tool or substance mass flow rate.

SUMMARY OF THE INVENTION

It is an object of the invention to ensure a uniform distribution of the particles of cutting material within the cutting body during the production of a cutting tool with a substance containing cutting material being deposited on the base body of the tool.

According to the invention, the individual sections of the bearing surface seen in the direction of displacement of the tool base body are moved in a direction opposite to that of the force of gravity of the particles of cutting material during the setting time of the substance deposited on the respective section. In theory, the bearing surface can be divided into any number of infinitesimally small sections along the direction of displacement of the tool base body. A certain quantity of the substance is deposited successively on each of these sections, where it is melted. According to the invention, such a section with the quantity of substance deposited thereon is moved in a direction opposite to that of the force of gravity at least in the period between the melting of the quantity of substance and the solidification of this quantity of melt, i.e. at least during the setting time. In other words, regardless of the course of the bearing surface, the substance is always deposited on a section of the bearing surface that is moved against the direction of the force of gravity, where it is worked as a component of the cutting body. Due to the direction of displacement mentioned above of the section of the bearing surface with a quantity of the substance deposited thereon, floating of the particles of cutting material always takes place in the preceding section already solidified. Therefore, these solidified sections of the cutting body constitute a natural barrier against further floating of the particles of cutting material subsequently deposited on the bearing surface, there being no need of any additional implementation.

This floating of the particles of cutting material leads to the desired uniform distribution of the particles of cutting material in the lengthwise direction of the cutting body that is being produced, since during the production of the cutting body, infinitesimally small sections of substance melt line up in the lengthwise direction of the cutting body, all having the same particle floating behavior. Along the overall height of the cutting body, the conventional floating of the particles of cutting material is entirely avoided due to the arrangement and displacement of the bearing surface during the production of the cutting body.

A cutting body is produced according to the invention, having a substantially uniform distribution of the cutting material throughout its volume. This cutting body of considerably improved action can be produced at a low cost by a conventional apparatus, since only a modified position of the moving base body of the tool relative to the conventional manufacturing apparatus is necessary for the production of the cutting body. This position is such that the substance containing the cutting material is deposited only on the section of the bearing surface that is moved against the direction of the force of gravity. The position of the components relative to each other, i.e. of the devices within the manufacturing apparatus, may remain entirely unchanged. Therefore, the regular distribution of the cutting material within the cutting body is possible without any additional requirements in terms of cost and material.

The invention ensures a uniform distribution of cutting material within any cutting material volumes. This is true for plane bearing surfaces as well as for bearing surfaces equipped with a surface relief or designed to be curved in cross-section, in particular in the way of a segment of a cylinder jacket. Only the guidance of the base body of the tool must be such that each section of the bearing surface is moved in a direction opposite to that of the force of gravity at least during the setting time of the deposited substance melt.

The cutting materials may for instance be CBN, diamond or SiC.

For especially good regular distribution of the particles of cutting material within the cutting body, each individual section of the bearing surface is disposed precisely parallel to the direction of the force of gravity at least during the setting time of the substance melt allocated to it and its direction of displacement is disposed likewise parallel to the direction of the force of gravity at least during this setting time. In many cases, however, sufficient regular distribution of the particles of cutting material is already obtained when the respective section of the bearing surface or the direction of displacement thereof is disposed at an acute angle to the direction of the force of gravity during the setting time. For sufficient cutting material distribution, the angle enclosed by the surface normal line of the section and by the direction of the force of gravity at least during the setting time of the allocated substance melt ranges from approximately 60° to 90°. The ideal case is 90°, which is especially easy to be put into practice with plane bearing surfaces.

In particular in the case of plane bearing surfaces, a translational motion of the base body of the tool or a translational drive for the base body of the tool is suitable for a uniform overall height of the cutting body and a regular distribution of cutting material to be obtained. In this way, also hones with customarily plane bearing surfaces can be manufactured by the method according to the invention.

A motion of rotation of the base body of the tool or a rotary drive for the base body of the tool make account for tool base bodies in the cross sectional shape of an arc of a circle or of circular design, the bearing surfaces of which extend cross-sectionally in the shape of an arc of a circle. In this case, each infinitesimally small section of the arc of a circle extends approximately parallel to the direction of the force of gravity during the setting of the substance melt at this section. As a result of the aforesaid measures, also saw blades are fabricable by the method according to the invention.

According to a preferred embodiment of the invention, the substance containing cutting material is a mixture of a metal powder (for instance bronze powder) and the particles of cutting material. This mixture ensures good adhesive strength of the solidified cutting body on the base body of the tool. Moreover, this mixture aids in the manufacture of the cutting body in a single coating pass, i.e. in a single pass of depositing the substance on the bearing surface.

Another preferred embodiment of the invention proposes diamond particles as particles of cutting material that have been successful in practice. This helps achieve an especially long lifetime of the cutting body accompanied with an invariably good cutting performance.

In keeping with a further preferred embodiment, the substance is injected on the bearing surface or injected on the bearing surface by means of a supply nozzle directed towards the bearing surface. By this measure, a certain quantity of substance is concentrated on the associated section of the bearing surface. The quantity of substance not worked is therefore reduced. This helps reduce the manufacturing cost of the cutting bodies and of the entire cutting tool. Furthermore, the actuation under pressure of the bearing surface by the particles of the substance improves the mechanically stable structure of the cutting body and the latter's strength of adhesion to the base body of the tool.

The invention further proposes the energy of a laser beam for acting on the bearing surface and for creating the substance melt. This is a laser radiating the bearing surface by sufficient focal spot size. In particular, the heating device is a solid laser (YAG laser). By advantage, this heating device can be acquired at a comparatively low price as a commercially available part bought externally. In this way the production cost of the cutting tool can be restricted.

Preferred embodiments of the invention further relate to preferred positions of the heating device in the form of a laser relative to the supply means in the form of a supply nozzle referred to the direction of the force of gravity and/or referred to the bearing surface coated with the substance. These positions of the heating device relative to the supply nozzle ensure well coordinated manufacturing parameters such as driving speed of the driving device for the base body of the tool, substance mass flow rate, setting time of the substance melt etc. This again simplifies the manufacture of the cutting body with the material properties required.

By the aid of a casting mold surrounding the base body of the tool and the bearing surfaces thereof, cutting bodies of pre-defined geometry can be produced easily and accurately in terms of manufacturing engineering. Any required cuboid geometry of the solidifying substance melt can be strictly observed by the aid of this casting mold and cutting bodies of any desired length can be produced, there being no deviations from the desired geometric dimensions and the desired shape of the solidified cutting body along the lengthwise direction of the cutting body. Mold casting and molds are known from BROCKHAUS NATURWISSENSCHAFTEN UND TECHNIK, WIESBADEN 1983, ISBN 3-7653-0357-7, vol. 2, page 204, and vol. 3, page 84. The casting molds are made from cast iron, steel. Also molds of copper or tungsten are suitable for the manufacture of the cutting tool according to the invention.

Details of the invention will become apparent from the ensuing description of exemplary embodiments, taken in conjunction with the drawing.

BRIEF DESCRIPTION OF THE DRAWING

FIG. 1 is a side view of details of a prior art apparatus for the manufacture of a cutting tool with the base body of a tool driven transversely to the direction of the force of gravity;

FIG. 2 is a sectional view, on an enlarged scale, of the solidified prior art cutting body on the line II and II in FIG. 1;

FIG. 3 is a side view of an apparatus for the manufacture of a cutting tool illustrated section by section, the base body of the tool, in accordance with the invention, being driven in a direction opposite to that of the force of gravity;

FIG. 4 is a sectional view, on an enlarged scale, of the cutting body produced according to the invention on the section line IV—IV in FIG. 3;

DESCRIPTION OF THE PREFERRED EMBODIMENTS

Figure 5:
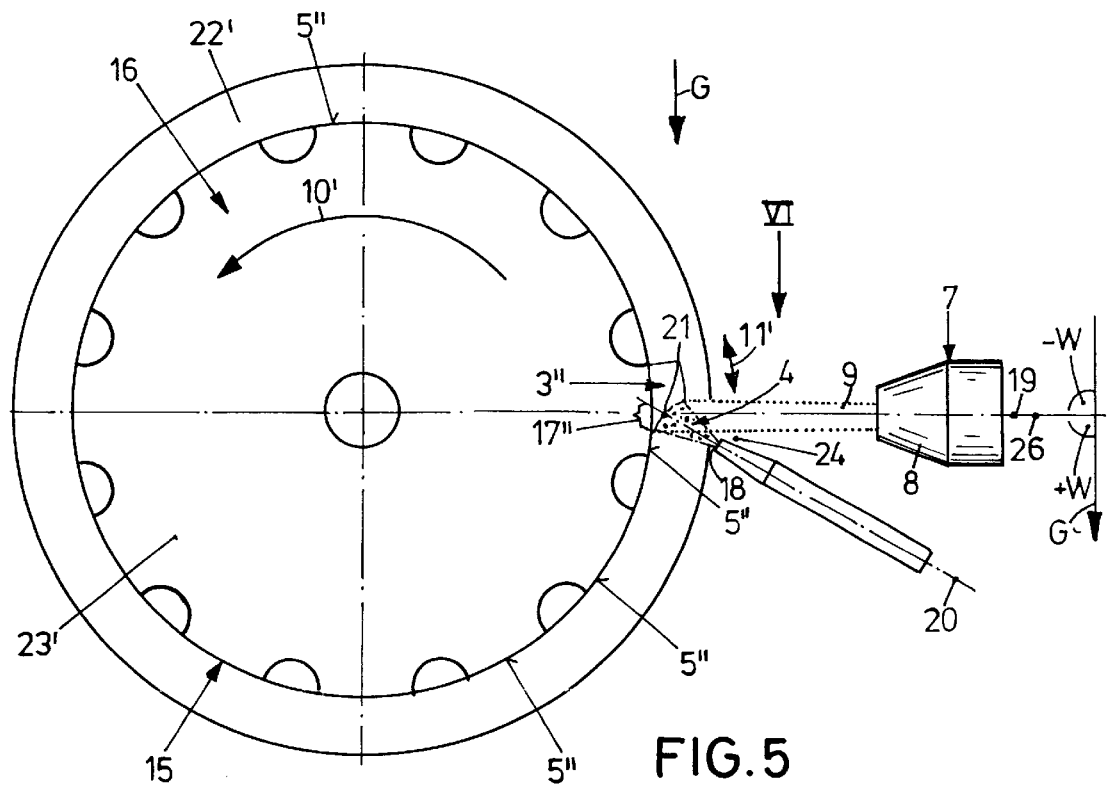
FIG. 5 is a side view of a second embodiment of a cutting tool manufactured according to the invention.

The cutting tool according to FIG. 1 is a hone 1 for the grinding of metal surfaces. It substantially comprises a cuboid metallic supporting strip 2 and at least one cutting body 3 as a grinding body supported by it. In its initial state, the cutting body 3 is deposited as a metallic substance 4 containing cutting material on a plane bearing surface 5 of the metallic supporting strip 2. To this end, the substance 4 containing cutting material is injected on the bearing surface 5 by the aid of a pneumatically actuated supply nozzle 6. By means of its laser head 8 and a focusing lens system, a laser 7 simultaneously emits a laser beam 9, the energy of which melts the particles of the substance 4 injected or blown into the zone of interaction of the laser beam 9 and the supporting surface 5, there forming a molten bath into which the substance 4 is fed and where it melts. Simultaneously the particles of the substance 4 adhere to the bearing surface 5 likewise melted by the laser beam 9. In this way, the substance 4 is united with the bearing surface 5 and solidifies to constitute the cutting body 3.

The hone 1 of FIG. 1 is driven in a direction of displacement 10 that is disposed at right angles to the direction of the force of gravity G. The infinitesimally small cutting body sections disposed in a lengthwise direction 11 of the cutting body that is parallel to the direction of displacement 10 have a certain setting time after the melting of the substance 4. During this setting time, the cutting material particles 12 contained in the substance 4 float against the direction of the force of gravity G. Due to the direction of displacement 10 extending at right angles to the direction of the force of gravity G, the particles 12 float along the overall height of the cutting body 3 in the direction of a cutting edge 13, opposing the bearing surface 3, of the cutting body 3. The prior art manufacture of the cutting tool results in the particles 12 of cutting material being segregated or concentrated in the vicinity of the cutting edge 13, while the other constituents of the metal pow der which forms a metal matrix 14 contain a considerably lower number of particles 12 of cutting material or no particles 12 at all (FIG. 2.).

Figure 6:
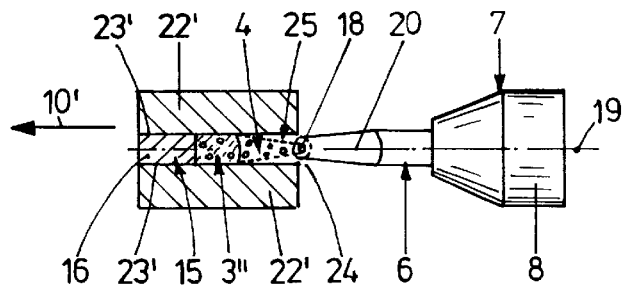
FIG. 6 is a partially sectional plan view of the cutting tool and the apparatus used for the manufacture of the cutting tool in accordance with the direction of the arrow VI in FIG. 5.

In the manufacture, according to the invention, of the cutting tool, the design of the manufacturing apparatus itself remains unchanged as compared to the prior art according to FIG. 1 (FIG. 3, FIG. 5, FIG. 6). The manufacture according to the invention of the cutting bodies 3' of a hone 1' (FIG. 3) and of the cutting bodies 3" of a saw blade 15 (FIG. 5) as another embodiment of a cutting tool is obtained solely by a modified arrangement, as compared with FIG. 1, of the directions of displacement 10, 10' and of the manufacturing apparatus relative to the direction of the force of gravity G. In FIG. 3 the supporting strip 2 and the bearing surface 5 of the hone 1' are advanced translationally by a drive (not shown) in the direction of displacement 10 against the direction of the force of gravity G. In this case the direction of displacement 10 is disposed parallel to the direction of the force of gravity G, however, in another embodiment, it may also cooperate with the direction of the force of gravity (G) to enclose an acute angle of about 30° maximally. In FIG. 5, a metallic support blade 16 of the saw blade 15 is advanced rotationally in the direction of displacement 10' by a drive (not shown), the support blade 16 being circular in cross-section and acting as a base body of a tool. In the case of the plane bearing surface 5' of the supporting strip 2 as well as in the case of the bearing surface 5", in the form of a cylinder jacket, of the support blade 2, the substance 4 containing the cutting material is always applied to, and solidifies at, an infinitesimally small section 17' or 17" extending approximately parallel to the direction of the force of gravity G. The surface normal 26 of the section 17' and 17" and the direction of the force of gravity G enclose an angle w of approximately 90°. In further embodiments—depending on the arrangement of the section 17' and 17" above (corresponding to −w) or below (corresponding to +w) the axis 19 of the laser beam- the angle w amounts to: $90°>w \geqq 60°$. The particles 12 of cutting material allocated to the section 17' or 17" always float approximately in the lengthwise direction 11 or 11' of the cutting body. This gives rise to a uniform distribution of the particles 12 within the metal matrix 4 (FIG. 4) throughout the overall height of the cutting body 3' or 3", the particles 12 of cutting material preferably being diamond particles.

The plane bearing surface 5 and the bearing surface 5' in the form of a cylinder jacket are only examples of the manufacture according to the invention of cutting bodies 3' or 3". Of course also other cross-sectional shapes of bearing surfaces are possible for the manufacture of the cutting tool according to the invention. It is essential that for every design of a tool base body and a bearing surface, at least that section is moved against the direction of the force of gravity G, of which the associated portion of substance 4 of cutting material is in the process of solidification, this being accompanied with the floating of the particles 12 of cutting material that is typical of this solidification.

For the manufacture of the cutting bodies 3', 3", the laser 7 is used as a heating device and the supply nozzle 6 as supply means. The aperture 18 of the supply nozzle 6 is directed towards the bearing surface 5' or 5". The laser beam 9 of the laser 7 is also directed towards the bearing surface 5' or 5". In this case, the laser beam axis 19 runs transversely to the direction of the force of gravity G and approximately vertically to the bearing surface section 17' or 17" radiated. A nozzle axis 20 extending in the lengthwise direction of the supply nozzle 6 and the laser beam axis 19 enclose an acute angle, the angle point 21 of this acute angle being within the volume of the cutting body 3' or 3" and spaced from the bearing surface 5' or 5".

During the manufacture of the cutting bodies 3' and 3", it is approximately the area of the section 17' and 17" extending parallel to the direction of the force of gravity G that is radiated by the laser beam 9. The substance 4 containing cutting material is blown or injected into the zone of interaction of the laser beam 9 and the section 17' and 17". Given a sufficient power density of the laser beam 9 (for instance $5 \times 10^3 W/cm^2$), any particles of the substance 4 that adhere to the section 17' and 17" will melt in this zone of interaction, forming a metallic molten bath into which the supplied substance 4 is introduced and where it melts. During the solidification process of the molten bath, the section 17' and 17" runs approximately parallel to the direction of the force of gravity G so that the particles 12 of cutting material only float in the lengthwise direction 11 and 11' of the cutting body.

For a cuboid geometry of the molten bath solidifying to constitute the cutting body 3' and 3" to be ensured, the hone 1' and the saw blade 15 are enveloped by a mold 22 of rectangular cross-section or by a mold 22' of circular cross-section, respectively. To simplify matters, FIG. 3 and FIG. 5 illustrate only one half of the mold 22 and 22'. The mold flanks the two opposite lateral faces 23 of the supporting strip 2 or the two lateral faces 23' of the support blade 16 and projects beyond the bearing surface 5' and 5" in the direction of the side 24 of supply of the substance 4 containing cutting material. The molds 22 and 22' define a cavity which joins the side 24 of supply to the bearing surface 5' and 5" and which is designated as a pouring cavity 25 in FIG. 6. The substance 4 is applied to the bearing surfaces 5', 5" through this cavity.

| List of Reference Numerals | |
|---|---|
| 1, 1' | hone |
| 2 | supporting strip |
| 3, 3', 3" | cutting body |
| 4 | substance containing cutting material |
| 5, 5', 5" | bearing surface |
| 6 | supply nozzle |
| 7 | laser |
| 8 | laser head |
| 9 | laser beam |
| 10, 10' | direction of displacement |
| 11, 11' | lengthwise direction of the cutting body |
| 12 | particles of cutting material |
| 13 | cutting edge |
| 14 | metal matrix |
| 15 | saw blade |
| 16 | support blade |
| 17, 17', 17" | section |
| 18 | nozzle aperture |
| 19 | laser beam axis |
| 20 | nozzle axis |
| 21 | angle point |
| 22, 22' | mold |
| 23, 23' | lateral face |
| 24 | side of supply |
| 25 | pouring cavity |
| 26 | surface normal line |
| G | direction of the force of gravity |
| w | angle |

What is claimed is:

1. A method of manufacturing a cutting tool (1, 1', 15) having a base body (2, 16) and at least one cutting body (3, 3', 3"), comprising:

moving said base body (2, 16) of the cutting tool (1, 1', 15) during the manufacture of the at least one cutting body (3, 3', 3")

depositing a substance (4) containing particles of cutting material (12) on a substrate surface (5, 5', 5") of the moved base body (2, 16), by subsequently depositing said substance (4) onto consecutive sections (17', 17") of the substrate surface (5, 5', 5") along a direction of movement of said base body (2, 16), the substance (4) being melted with a laser and united with the substrate surface (5, 5', 5") while solidifying to form the cutting body (3, 3', 3") and wherein the particles of cutting material (12) are uniformly distributed in the substrate (4);

wherein each of said sections (17', 17"), at least during a setting time for said solidifying of the substance (4) deposited thereon by said movement of the base body (2, 16), is displaced in such a direction opposite to that of force of gravity (G) that a surface normal line (26) of the section (17, 17") of the substrate surface (5, 5', 5") and the direction of the force of gravity (G) make an angle (±w), $90° \geq w \geq 60°$ applying to the angle (±w).

2. A method according to claim 1, wherein the base body (2) is moved by a translational motion (10).

3. A method according to claim 1, wherein the base body (16) is moved by a rotational motion (10').

4. A method according to claim 1, wherein the substance (4) further comprises metal powder (14) in addition to said particles of cutting material (12).

5. A method according to claim 1, wherein the particles of cutting material (12) are diamond particles.

6. A method according to claim 1, wherein the substance (4) is sprayed on the substrate surface (5', 5").

7. A method according to claim 1, wherein the substance (4) is melted on the substrate surface (5', 5") by a laser beam (9).

8. A method according to claim 1, wherein that the cutting body (3', 3") is produced in a pouring cavity (25) defined between two lateral molds (22, 22') flanking lateral faces (23, 23') of the base body (2, 16).

9. A method of manufacturing a cutting tool having a cutting surface supported by a base body, said cutting surface comprising particles of cutting material in a matrix, said method comprising:

positioning said base body in a facing relationship with a laser adapted to project a laser beam in a generally horizontal direction, moving said base body generally upwardly against the force of gravity past said laser, depositing a substance and said particles of cutting material onto a surface of said base body facing said laser while moving said base body generally upwardly against the force of gravity, and projecting laser light generally horizontally and melting said substance on said surface of said base body with said light from said laser while moving said base body generally upwardly against the force of gravity to unite said substance containing said particles of cutting material with the surface of said base body, and to uniformly distribute the particles of cutting material within the matrix of said substance.

10. The method of claim 9 wherein said substance comprises metal powder and said particles of cutting material comprise at least one of cubic boron nitride, diamond and SiC.

* * * * *